(12) United States Patent
Yamada

(10) Patent No.: US 7,098,975 B2
(45) Date of Patent: Aug. 29, 2006

(54) LIQUID CRYSTAL DISPLAY DEVICE

(75) Inventor: Yoshitaka Yamada, Kumagaya (JP)

(73) Assignee: Toshiba Matsushita Display Technology Co., Ltd., Tokyo (JP)

( * ) Notice: Subject to any disclaimer, the term of this patent is extended or adjusted under 35 U.S.C. 154(b) by 0 days.

(21) Appl. No.: 11/058,299

(22) Filed: Feb. 16, 2005

(65) Prior Publication Data

US 2005/0179837 A1 Aug. 18, 2005

(30) Foreign Application Priority Data

Feb. 16, 2004 (JP) ............................. 2004-038695

(51) Int. Cl.
*G02F 1/1335* (2006.01)

(52) U.S. Cl. ...................... 349/112; 349/113

(58) Field of Classification Search ................ 349/112
See application file for complete search history.

(56) References Cited

U.S. PATENT DOCUMENTS

| | | | | |
|---|---|---|---|---|
| 5,751,384 A | * | 5/1998 | Sharp | 349/18 |
| 5,808,709 A | * | 9/1998 | Davis et al. | 349/65 |
| 5,870,159 A | * | 2/1999 | Sharp | 349/121 |
| 5,875,014 A | * | 2/1999 | Kuwabara et al. | 349/117 |
| 5,929,946 A | * | 7/1999 | Sharp et al. | 349/18 |
| 5,953,083 A | * | 9/1999 | Sharp | 349/18 |
| 6,141,071 A | * | 10/2000 | Sharp | 349/121 |
| 6,204,904 B1 | * | 3/2001 | Tillin et al. | 349/119 |
| 6,273,571 B1 | * | 8/2001 | Sharp et al. | 353/122 |
| 6,512,560 B1 | * | 1/2003 | Ohtake et al. | 349/114 |
| 6,552,767 B1 | * | 4/2003 | Kaneko | 349/119 |
| 6,559,915 B1 | * | 5/2003 | Amimori et al. | 349/112 |
| 6,844,913 B1 | * | 1/2005 | Leidig | 349/112 |
| 6,906,767 B1 | * | 6/2005 | Iijima | 349/113 |
| 2002/0012085 A1 | * | 1/2002 | Honda et al. | 349/112 |
| 2003/0160917 A1 | * | 8/2003 | Takahashi et al. | 349/113 |
| 2004/0056994 A1 | * | 3/2004 | Honda et al. | 349/112 |
| 2004/0100597 A1 | * | 5/2004 | Fukuda et al. | 349/112 |
| 2005/0001957 A1 | * | 1/2005 | Amimori et al. | 349/112 |

FOREIGN PATENT DOCUMENTS

| | | |
|---|---|---|
| JP | 2003-121847 | 4/2003 |
| JP | 2003-0255317 | 9/2003 |

* cited by examiner

*Primary Examiner*—James A. Dudek
(74) *Attorney, Agent, or Firm*—Oblon, Spivak, McClelland, Maier & Neustadt, P.C.

(57) ABSTRACT

In order to reduce an occurrence of a double image, to improve a contrast ratio in transmissive display, and to widen a viewing angle, a light diffusion layer for restricting the occurrence of the double image is placed between a viewing angle compensating plate and a reflective layer. With this configuration, though traveling directions of light emitted from a backlight placed on an outside of the reflective layer are changed in the light diffusion layer, the traveling directions are not changed in the viewing angle compensating plate and a liquid crystal layer once the light is made incident onto the viewing angle compensating plate, and the light travels straight in any of the vertical direction and slanting directions. Thus, the viewing angle compensating plate can exert an original function thereof to compensate a phase difference and can ensure a viewing angle widely.

2 Claims, 12 Drawing Sheets

FIG. 12

| | | EXAMPLE 1 | EXAMPLE 2 | COMPARATIVE EXAMPLE 1 | COMPARATIVE EXAMPLE 2 | COMPARATIVE EXAMPLE 3 | COMPARATIVE EXAMPLE 4 |
|---|---|---|---|---|---|---|---|
| LIGHT DIFFUSION LAYER | PRESENCE | PRESENT | PRESENT | NONE | PRESENT | NONE | PRESENT |
| | PLACE | BETWEEN VIEWING ANGLE COMPENSATING PLATE AND POLARIZING PLATE | BETWEEN VIEWING ANGLE COMPENSATING PLATE AND 1/2 WAVE PLATE | — | BETWEEN TRANSPARENT SUBSTRATE AND POLARIZING PLATE | — | BETWEEN TRANSPARENT SUBSTRATE AND VIEWING ANGLE COMPENSATING PLATE |
| VIEWING ANGLE COMPENSATING PLATE PRESENCE | | PRESENT | PRESENT | NONE | NONE | PRESENT | PRESENT |
| CONTRAST RATIO | FRONT | 300 | 300 | 300 | 300 | 300 | 150 |
| VIEWING ANGLE CHARACTERISTICS | LEFT + RIGHT | 140° | 140° | 70° | 70° | 140° | 110° |
| | UPPER + LOWER | 110° | 110° | 60° | 60° | 110° | 80° |
| DOUBLE IMAGE (PARALLAX) OWING TO REFLECTED LIGHT | | NONE | NONE | PRESENT | NONE | PRESENT | NONE |

_US 7,098,975 B2_

LIQUID CRYSTAL DISPLAY DEVICE

CROSS-REFERENCE TO RELATED APPLICATIONS

This application is based upon and claims the benefit of priority from Japanese Patent Application No. 2004-038695 filed on Feb. 16, 2004; the entire contents of which are incorporated herein by reference.

BACKGROUND OF THE INVENTION

1. Field of the Invention

The present invention relates to a liquid crystal display device which mainly performs transmissive display by a backlight and is capable of performing reflective display utilizing external light in a place where illumination of the external light is intense.

2. Description of the Related Art

FIG. 1 is a cross-sectional view showing a configuration of a liquid crystal display device of a first related art. The liquid crystal display device has a configuration, in which a liquid crystal layer 3 is held between an array substrate 1 and an opposite substrate 2, and a backlight 4 is placed on an outside of the array substrate 1.

In the array substrate 1, a polarizing plate 12 is pasted on an outer surface of a glass-made transparent substrate 11 by a transparent adhesive layer 13, an address line 14 is formed on an inner surface of the transparent substrate 11, a transparent insulating layer 15 is formed entirely on the upper surface of the transparent substrate 11, and a pixel electrode 16 and a switching element 17 are formed on an upper surface of the transparent insulating layer 15.

In the opposite substrate 2, a polarizing plate 22 is pasted on an outer surface of a glass-made transparent substrate 21 by a transparent adhesive layer 23, a color filter 24 and a black matrix 25 are formed on an inner surface of the transparent substrate 21, and an opposite electrode 26 is formed so as to cover the color filter 24.

The backlight 4 is a light source using a white LED (Light Emitting Diode). In the case of transmissive display, light emitted by the backlight 4 transmits through the array substrate 1, the liquid crystal layer 3 and the opposite substrate 2 in this order, and is utilized for the display.

Moreover, a reflective layer 41 is formed between the polarizing plate 12 and the backlight 4. In the case of reflective display, light from the outside, such as a sunbeam, is made incident onto a display screen, and transmits through the opposite substrate 2, the liquid crystal layer 3 and the array substrate 1. Then, the light is reflected on the reflective layer 41, transmits through the array substrate 1, the liquid crystal layer 3 and the opposite substrate 2, and is utilized for the display.

However, the first related art has had a problem that a displayed image by the light from the backlight and a reflected image by the light reflected on the reflective layer 41 are overlapped on each other to cause a double image (parallax), leading to deterioration of image quality.

FIG. 2 is a cross-sectional view showing a configuration of a liquid crystal display device of a second related art. In this liquid crystal display device, a light diffusion layer 18 is formed between the transparent substrate 11 and polarizing plate 12 of the array substrate 1 for the purpose of reducing an occurrence of the double image. Other portions are similar to those in FIG. 1. A placement position of the light diffusion layer, usually, should be on the backlight side rather than the liquid crystal layer side when viewed from the display screen side. A reason for this is that, when the light diffusion layer is placed on the display screen side, a character blur owing to light scattering becomes prone to occur on the display screen, leading to the deterioration of the image quality. Note that, as a technology using the light diffusion layer, ones described in Japanese Patent Laid-Open Publication Nos. 2003-255317 and 2003-121847 are known.

FIG. 3 is a cross-sectional view showing a configuration of a liquid crystal display device of a third related art. In this liquid crystal display device, for the purpose of expanding a viewing angle, a viewing angle compensating plate 19 is placed between the transparent substrate 11 and polarizing plate 12 of the array substrate 1, and a viewing angle compensating plate 29 is placed between the transparent substrate 21 and polarizing plate 22 of the opposite substrate 2. This viewing angle compensating plate 19 is pasted on the transparent substrate 11 by the transparent adhesive layer 13 and on the polarizing plate 12 by a transparent adhesive layer 20. Moreover, the viewing angle compensating plate 29 is pasted on the transparent substrate 21 by a transparent adhesive layer 30 and on the polarizing plate 22 by the transparent adhesive layer 23. Other portions are similar to those in FIG. 1.

FIG. 4 is a cross-sectional view showing a configuration of a liquid crystal display device of a fourth related art. In this liquid crystal display device, for both of the purposes of reducing the occurrence of the double image and expanding the viewing angle, the light diffusion layer 18 is placed between the transparent substrate 11 and viewing angle compensating plate 19 of the array substrate 1 in FIG. 3. Other portions are similar to those in FIG. 3. As described above, the fourth related art is one for achieving the reduction of the occurrence of the double image and the expansion of the viewing angle by providing both of the light diffusion layer 18 and the viewing angle compensating plates 19 and 29.

However, though the reduction of the occurrence of the double image is achieved, the fourth related art has had a problem that a contrast ratio is significantly lowered in the case of the transmissive display, resulting in narrowing of a range of the viewing angle.

SUMMARY OF THE INVENTION

An object of the present invention is to reduce an occurrence of a double image in a liquid crystal display device, to improve a contrast ratio in transmissive display, and to widen a viewing angle.

A liquid crystal display device of the present invention includes: a pair of transparent substrates placed opposite to each other; a liquid crystal layer placed between the respective transparent substrates; a pair of polarizing plates placed on outsides of the respective transparent substrates; a reflective layer placed on an outside of one of the polarizing plates; a viewing angle compensating plate placed between the polarizing plate and the transparent substrate on a side where the reflective layer is provided; and a light diffusion layer placed not between the transparent substrate and the viewing angle compensating plate but between the viewing angle compensating plate and the reflective layer.

According to this invention, the light diffusion layer is placed not between the transparent substrate and the viewing angle compensating plate but between the viewing angle compensating plate and the reflective layer. Accordingly, once the light emitted from the backlight is made incident onto the viewing angle compensating plate through the reflective layer and the light diffusion layer, the traveling directions thereof are not changed by the viewing angle compensating plate and the liquid crystal layer and the transmitted light travels straight. Thus, the lowering of the contrast ratio can be prevented, and the expansion of the viewing angle can be achieved. Moreover, the light diffusion layer can restrict the occurrence of the double image caused by the light reflected on the reflective layer.

BRIEF DESCRIPTION OF THE DRAWINGS

FIG. 12 shows a table summarizing optical characteristics of the respective liquid crystal display devices.

DESCRIPTION OF THE EMBODIMENT

The inventor performed a simulation based on the principle of expansion of the viewing angle, and found out that the lowering of the contrast ratio in the case of the transmissive display in the fourth related art was caused by the following reasons.

Figure 1:
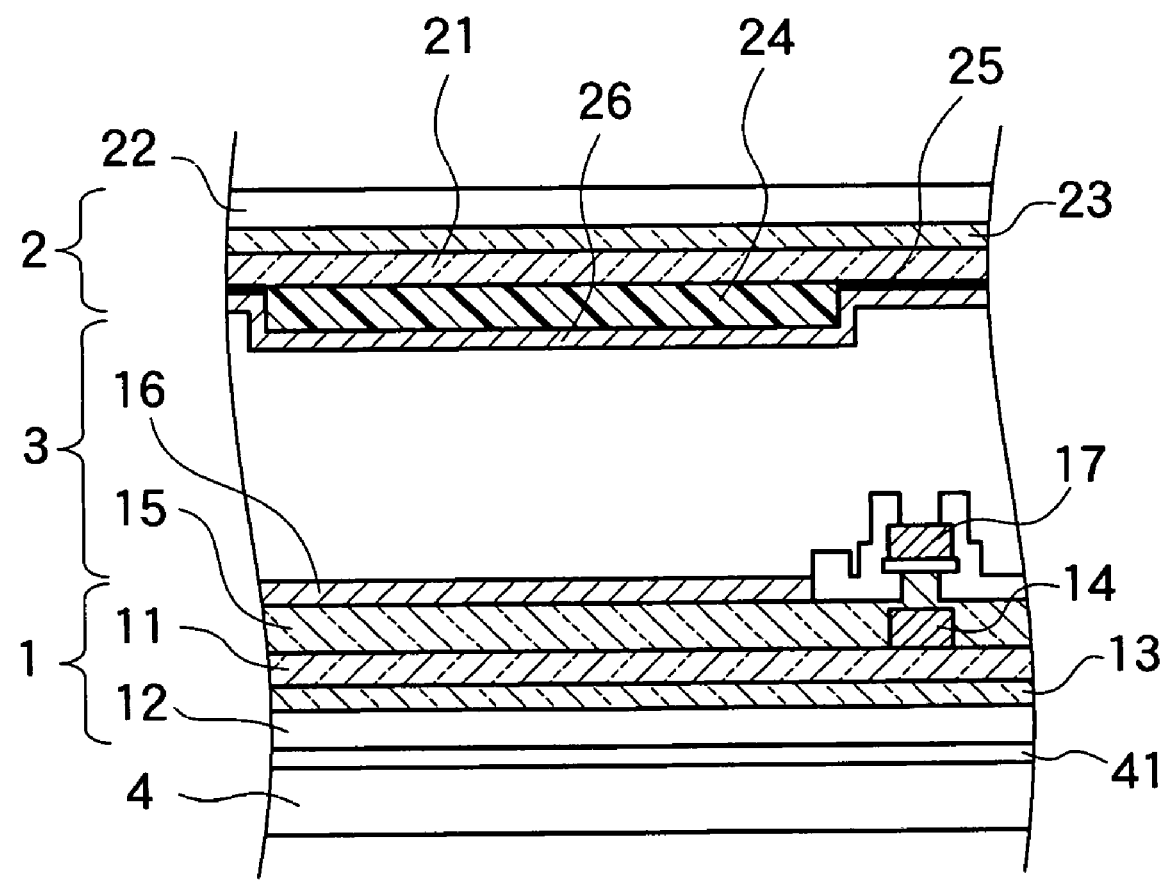
FIG. 1 shows a cross-sectional view of a liquid crystal display device according to a first related art.
Figure 2:
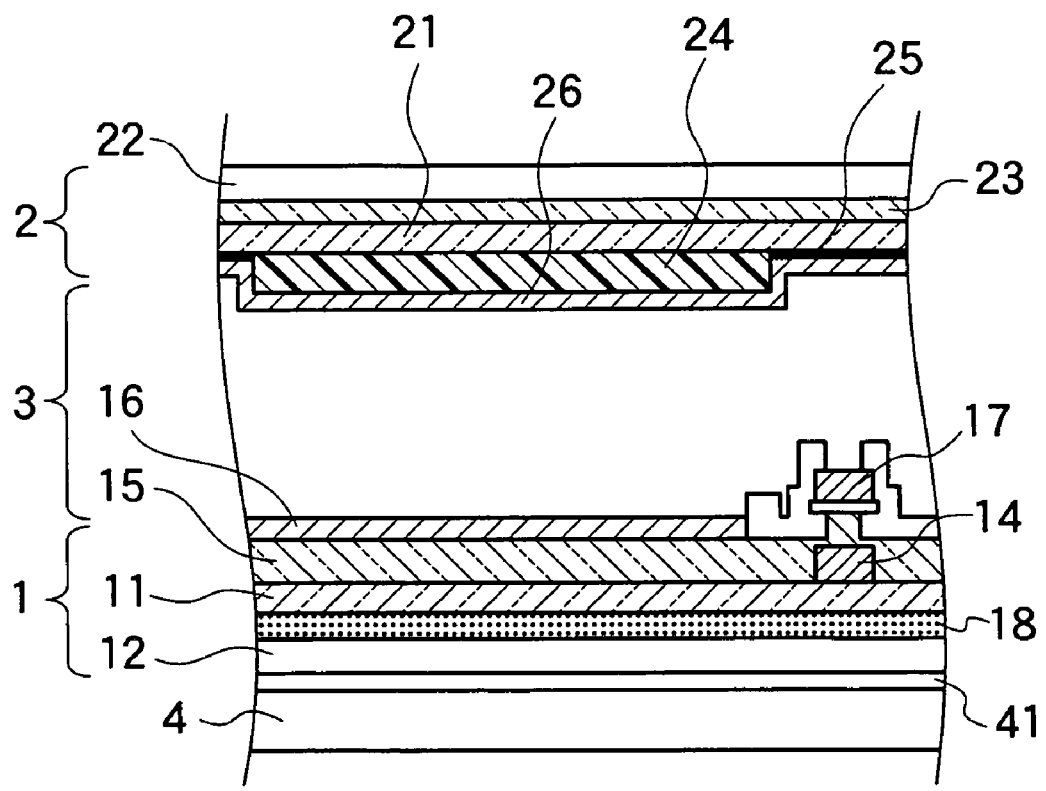
FIG. 2 shows a cross-sectional view of a liquid crystal display device according to a second related art.
Figure 3:
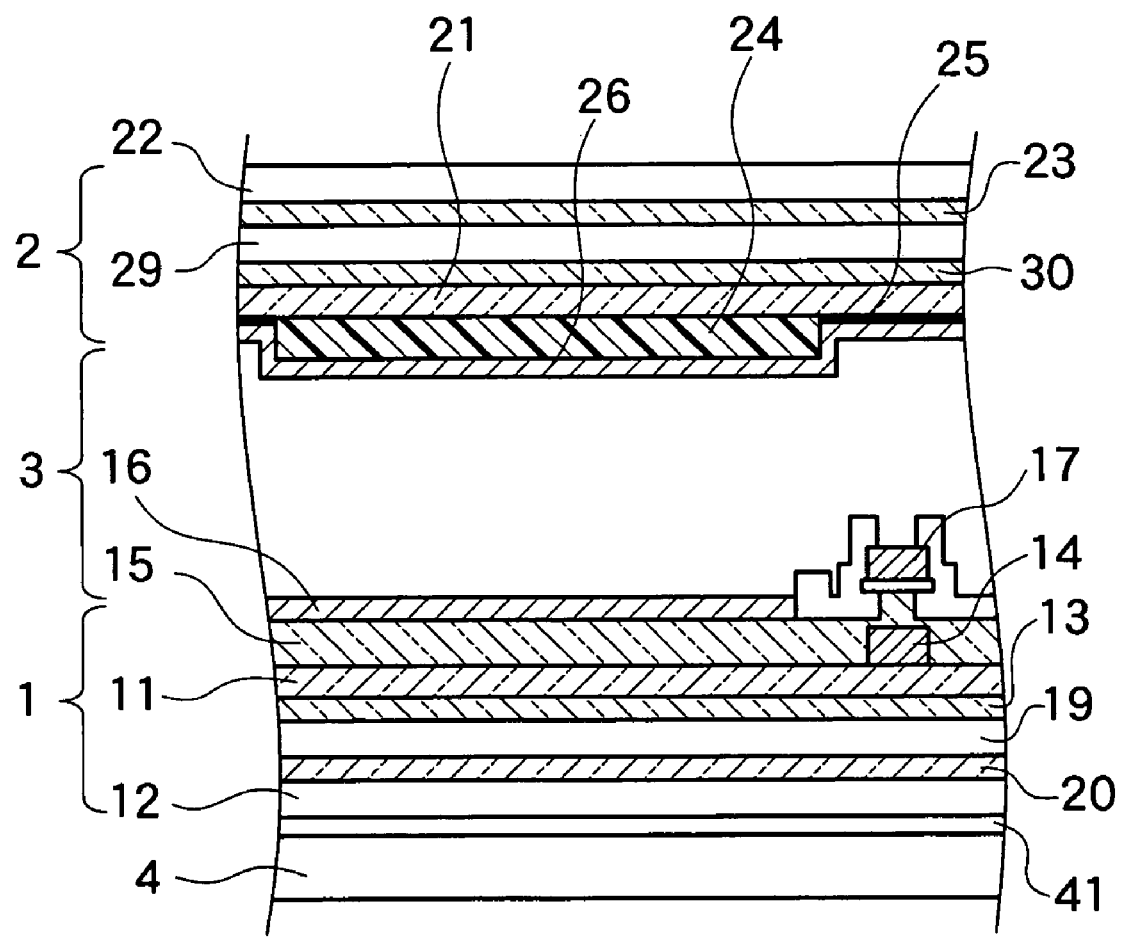
FIG. 3 shows a cross-sectional view of a liquid crystal display device according to a third related art.
Figure 5:
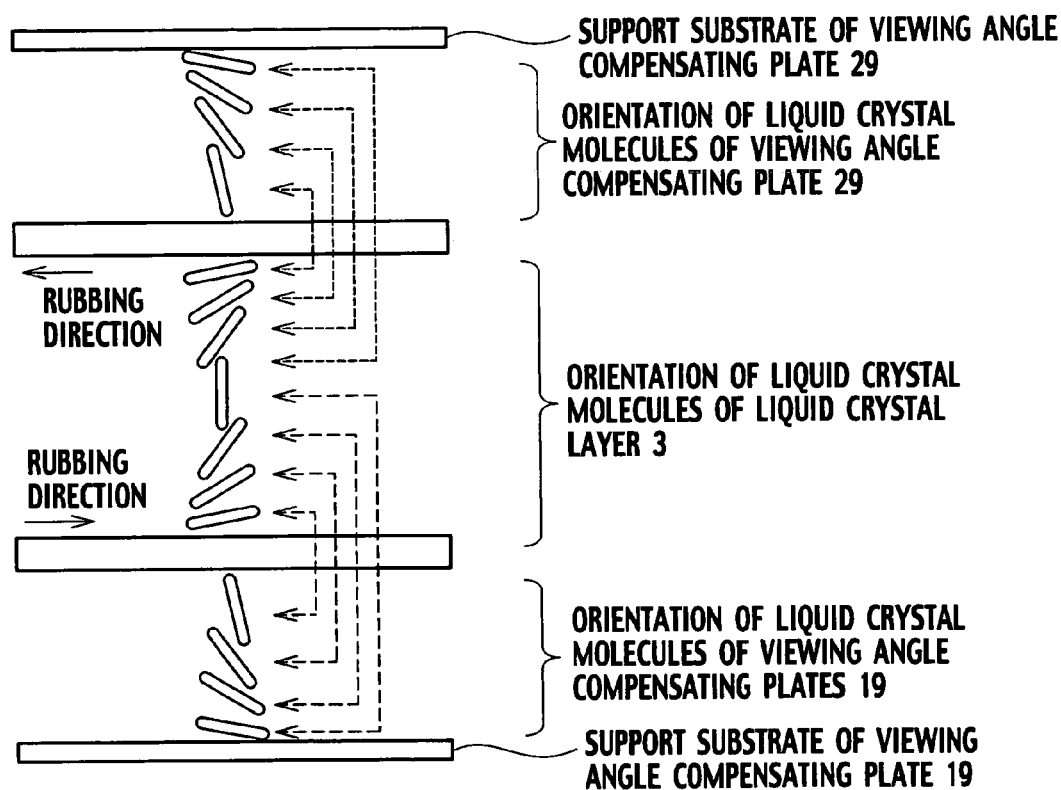
FIG. 5 shows a view for explaining a principle of expansion of a viewing angle.

First, the principle of expansion of the viewing angle will be described by use of FIG. 5. FIG. 5 shows orientations of liquid crystal molecules of the respective layers in the liquid crystal display device shown in FIG. 3.

The liquid crystal layer 3 is driven by a voltage applied between the pixel electrode and the opposite electrode, and by a value of this voltage, orientation states of the liquid crystal molecules are controlled. Each of the viewing angle compensating plates 19 and 29 is formed of a polymer compound containing liquid crystal molecules of which orientation state is fixed.

The expansion of the viewing angle is achieved in the following manner. For the liquid crystal molecules of the liquid crystal layer 3 and the liquid crystal molecules of the viewing angle compensating plates 19 and 29, the orientation states are formed respectively such that an optical compensation relationship which does not shift a phase difference in a viewing angle range including a front direction is established for the display screen, thereby reducing the lowering of the contrast ratio.

Figure 6:
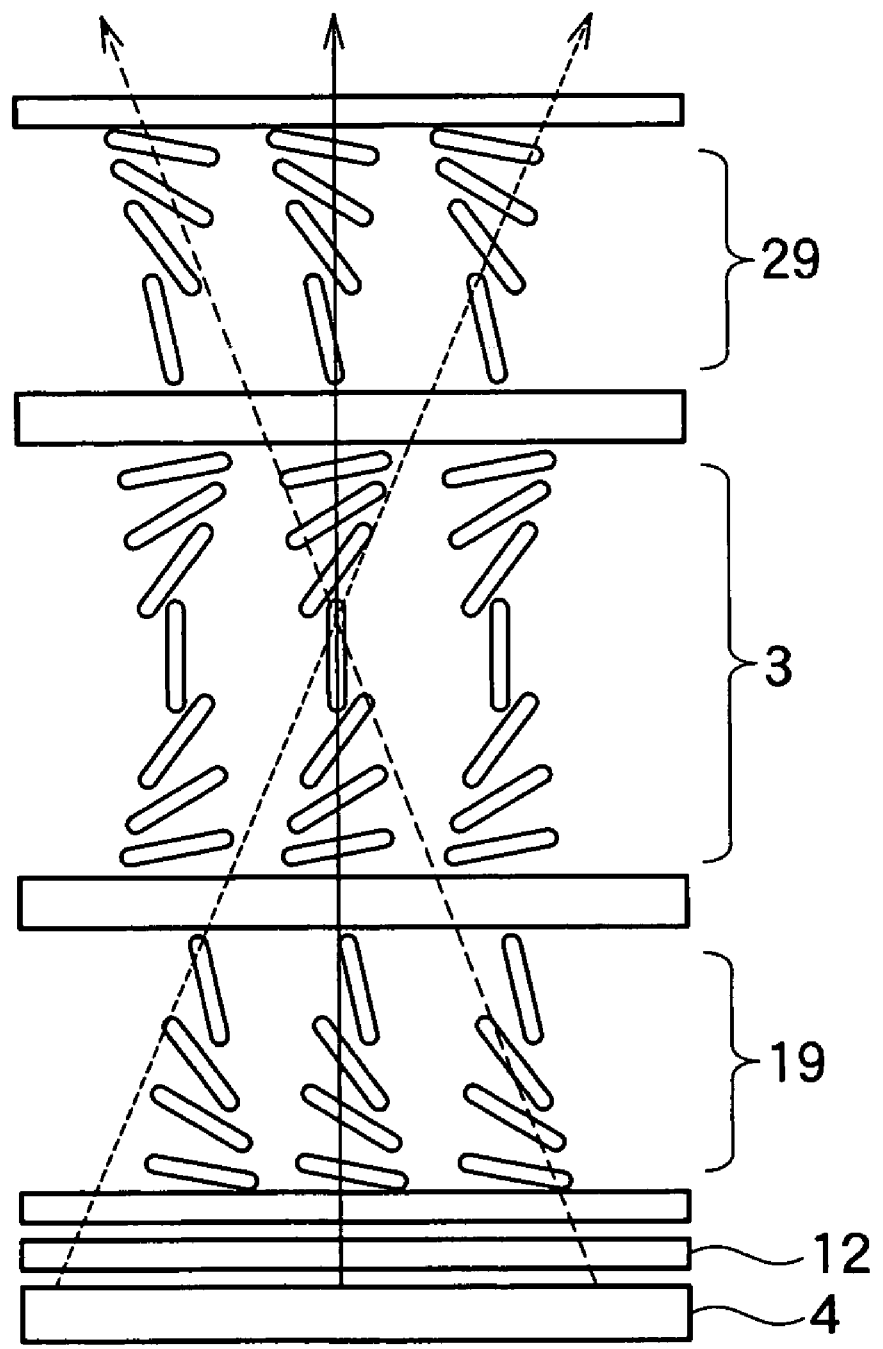
FIG. 6 shows optical paths of light emitted by a backlight in the third related art.

In this case, as shown in FIG. 6, light emitted from the backlight 4 transmits through the polarizing plate 12 and the viewing angle compensating plate 19, undergoes a predetermined optical modulation there, and then is made incident onto the liquid crystal layer 3. Here, the light diffusion layer is not used, and accordingly, optical paths of the transmitted light travel straight in any of the vertical direction and slanting directions without changing traveling directions thereof by the viewing angle compensating plate 19 and the liquid crystal layer 3. In this case, the respective orientation states of the liquid crystal molecules of the liquid crystal layer 3 and the liquid crystal molecules of the viewing angle compensating plate 19 function effectively. Accordingly, the viewing angle compensating plate 19 exerts an original function thereof to compensate the phase difference.

Figure 4:
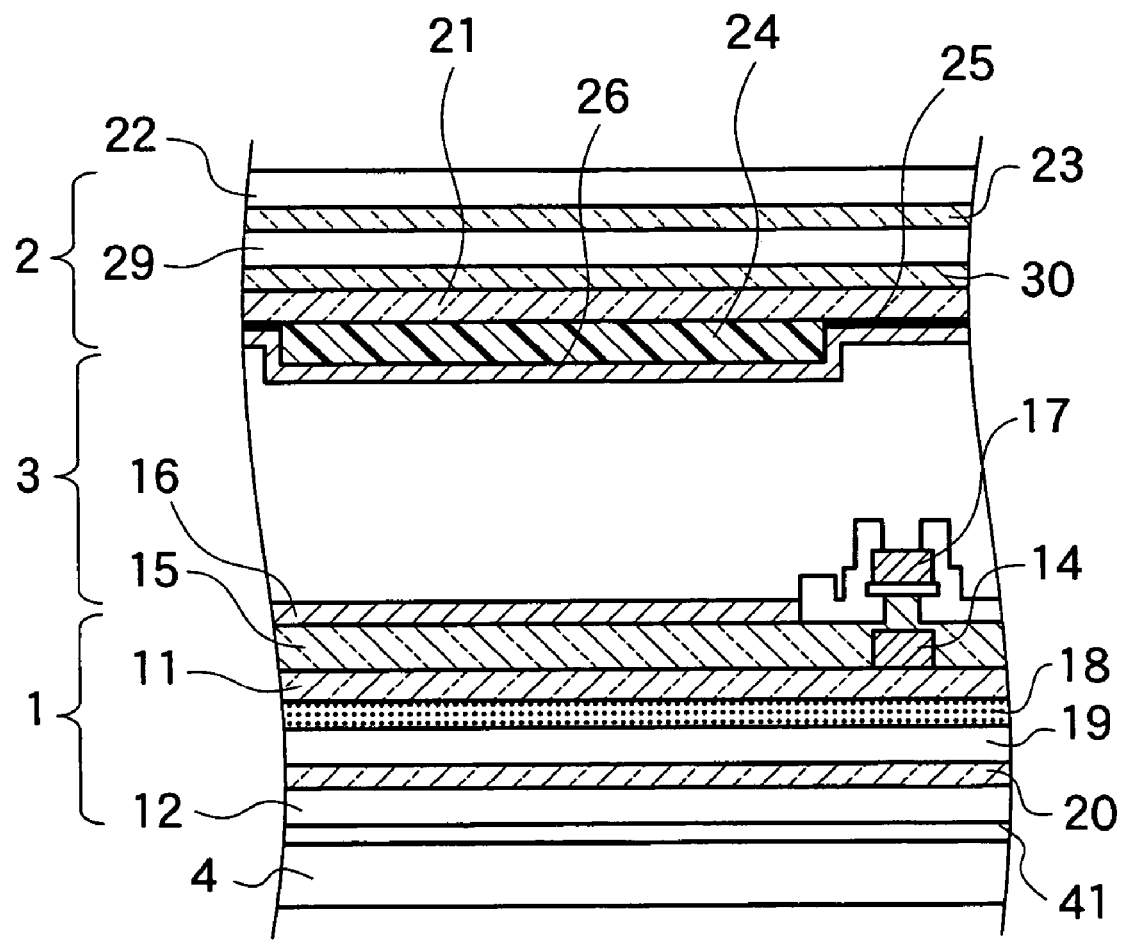
FIG. 4 shows a cross-sectional view of a liquid crystal display device according to a fourth related art.

Next, detailed consideration will be made for the fourth related art in which the light diffusion layer 18 is placed between the transparent substrate 11 and the viewing angle compensating plate 19 as shown in FIG. 4 for the purpose of reducing the occurrence of the double image caused by the reflected light.

Figure 7:
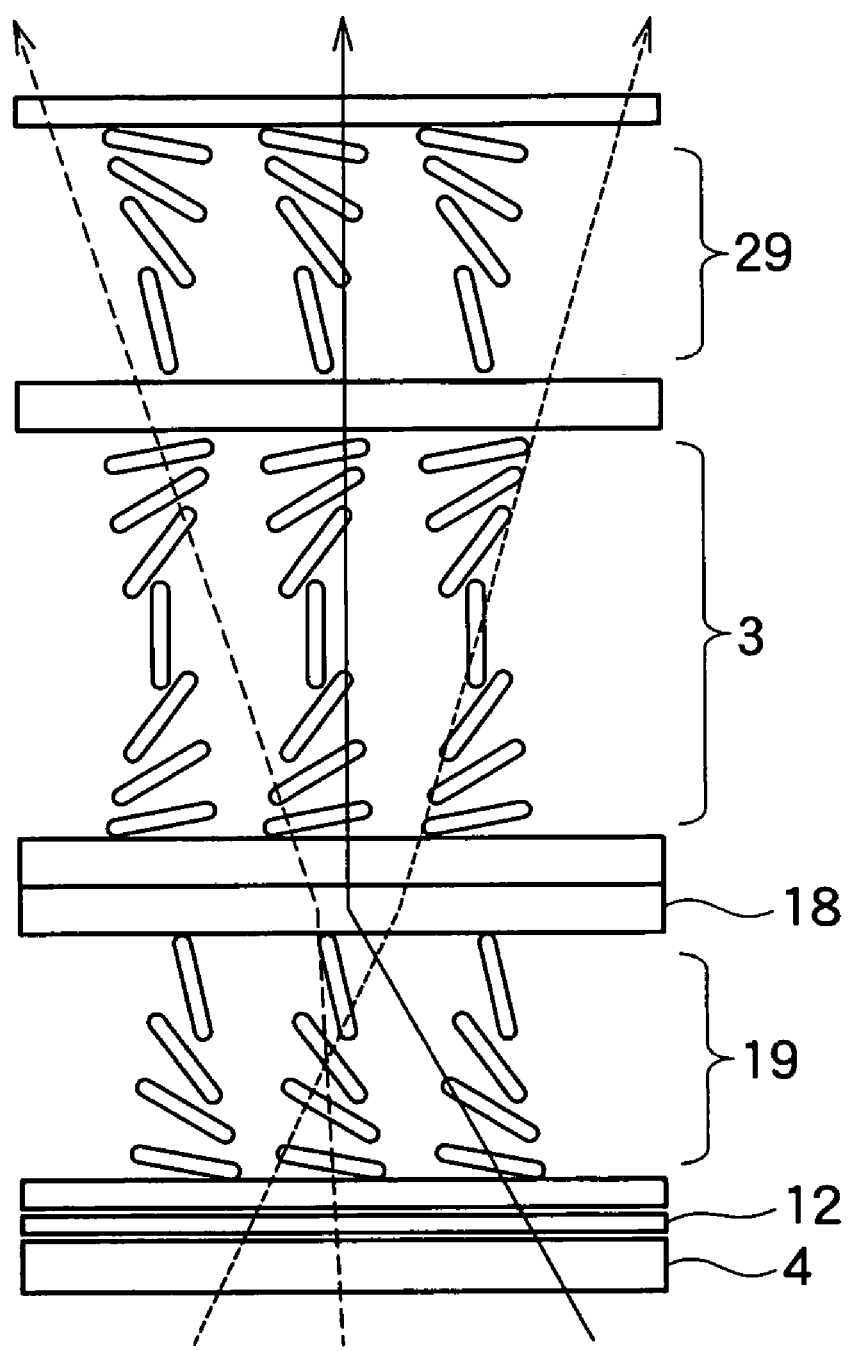
FIG. 7 shows optical paths of light emitted by a backlight in the fourth related art.

As shown in FIG. 7, light emitted from the backlight 4 transmits through the polarizing plate 12 and the viewing angle compensating plate 19, undergoes a predetermined optical modulation there, and then is made incident onto the light diffusion layer 18. This light is made incident onto the liquid crystal layer 3 after traveling directions thereof are changed into various directions by the light diffusion layer 18. The respective orientation states of the liquid crystal molecules of the liquid crystal layer 3 and the liquid crystal molecules of the viewing angle compensating plate 19 are ones designed on the premise that the light transmitting therethrough travels straight. Accordingly, the function of the viewing angle compensating plate 19 to compensate the phase difference is lowered. For this reason, in the transmissive display, the contrast ratio is lowered.

As described above, in the fourth related art, the viewing angle compensating plate 19 for expanding the viewing angle comes to no effective function owing to the presence of the light diffusion layer 18 for restricting the occurrence of the double image, the contrast ratio is significantly lowered.

In a liquid crystal display device of this embodiment, a cause of the lowering of the contrast ratio as described above is considered, and an improvement of the contrast ratio is achieved by changing a position of the light diffusion layer.

Figure 8:
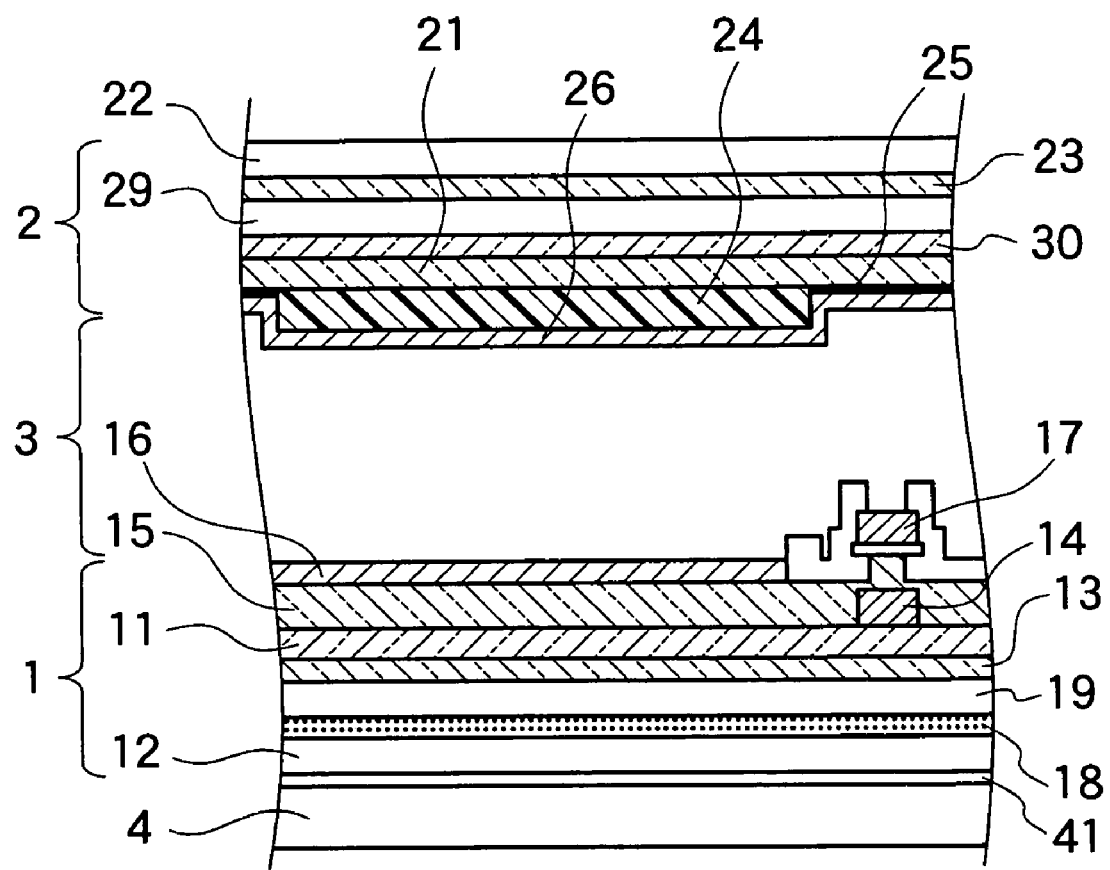
FIG. 8 shows a cross-sectional view of a liquid crystal display device in an embodiment.

FIG. 8 is a cross-sectional view showing a configuration of the liquid crystal display device of this embodiment. In the liquid crystal display device of this embodiment, the light diffusion layer 18 is placed not between the transparent substrate 11 and the viewing angle compensating plate 19 but between the viewing angle compensating plate 19 and the reflective layer 41. More specifically, the light diffusion layer 18 is placed between the viewing angle compensating plate 19 and the polarizing plate 12.

The light diffusion layer 18 is the one in which diffusing filler of a non-suction type is dispersed into adhesive to join the viewing angle compensating plate 19 and the polarizing plate 12, and also serves as an adhesive. A light diffusion factor in the light diffusion layer 18 ranges from 10% to 80% in the haze value. A light diffusion factor between a liquid crystal layer 3 and the viewing angle compensating plate 19 is 10% or less in the haze value.

As for other configurations, the liquid crystal layer 3 is held between an array substrate 1 and an opposite substrate 2, and a backlight 4 is placed on an outside of the array substrate 1.

In the array substrate 1, the viewing angle compensation plate 19 is pasted on an outer surface of the glass-made transparent substrate 11 by a transparent adhesive layer 13. On an outer surface of the viewing angle compensating plate 19, the light diffusion layer 18 and the polarizing plate 12 are placed, and further, on an outside thereof, the reflective layer 41 is placed. The reflective layer 41 may be formed on the outer surface of the polarizing plate 12, or a condenser sheet or a diffusion sheet may be made to serve as the reflective layer 41. An address line 14 is formed on an inner surface of the transparent substrate 11, and a transparent insulating layer 15 is formed entirely on the upper surface thereof. A pixel electrode 16 and a switching element 17 are formed on an upper surface of the transparent insulating layer 15. For example, a TFT (Thin Film Transistor) with a MOS structure is used as the switching element 17.

In the opposite substrate 2, a viewing angle compensating plate 29 is pasted on an outer surface of a glass-made transparent substrate 21 by a transparent adhesive layer 30, and further, on an outer surface of the viewing angle compensating plate 29, a polarizing plate 22 is pasted by a transparent adhesive layer 23. A color filter 24 and a black matrix 25 are formed on an inner surface of the transparent substrate 21, and an opposite electrode 26 is formed so as to cover the color filter 24.

For the respective surfaces of the array substrate 1 and the opposite substrate 2, which are in contact with the liquid crystal layer 3, a rubbing treatment is performed so as to establish an axial relationship substantially orthogonal or parallel to the liquid crystal layer 3 in order to orient the liquid crystal molecules concerned.

The liquid crystal layer 3 is of a twisted nematic type in which major axes of the liquid crystal molecules are continuously twisted by 90° between the array substrate 1 and the opposite substrate 2. Light incident onto the liquid crystal layer 3 rotates by 90° along the twist of the liquid crystal molecules in a state where no voltage is applied to the liquid crystal layer 3. Note that the orientation state of the liquid crystal molecules in the liquid crystal layer 3 may be set at a homogeneous orientation.

Each of the viewing angle compensating plates 19 and 29 is a plate formed of a polymer compound containing liquid crystal molecules of which orientation state is fixed. In the concretely, the liquid crystal of the twisted nematic type is used, and the orientation state of the liquid crystal molecules is set at a hybrid orientation.

The backlight 4 is a light source using a white LED (Light Emitting Diode). In the case of the transmissive display, light emitted by the backlight 4 transmits through the array substrate 1, the liquid crystal layer 3 and the opposite substrate 2 in this order, and is utilized for the display.

Meanwhile, in the case of the reflective display, light from the outside, such as a sunbeam, which is made incident onto the display screen, transmits through the opposite substrate 2, the liquid crystal layer 3 and the array substrate 1. Then, the light is reflected on the reflective layer 41, transmits through the array substrate 1, the liquid crystal layer 3 and the opposite substrate 2, and is utilized for the display.

Figure 9:
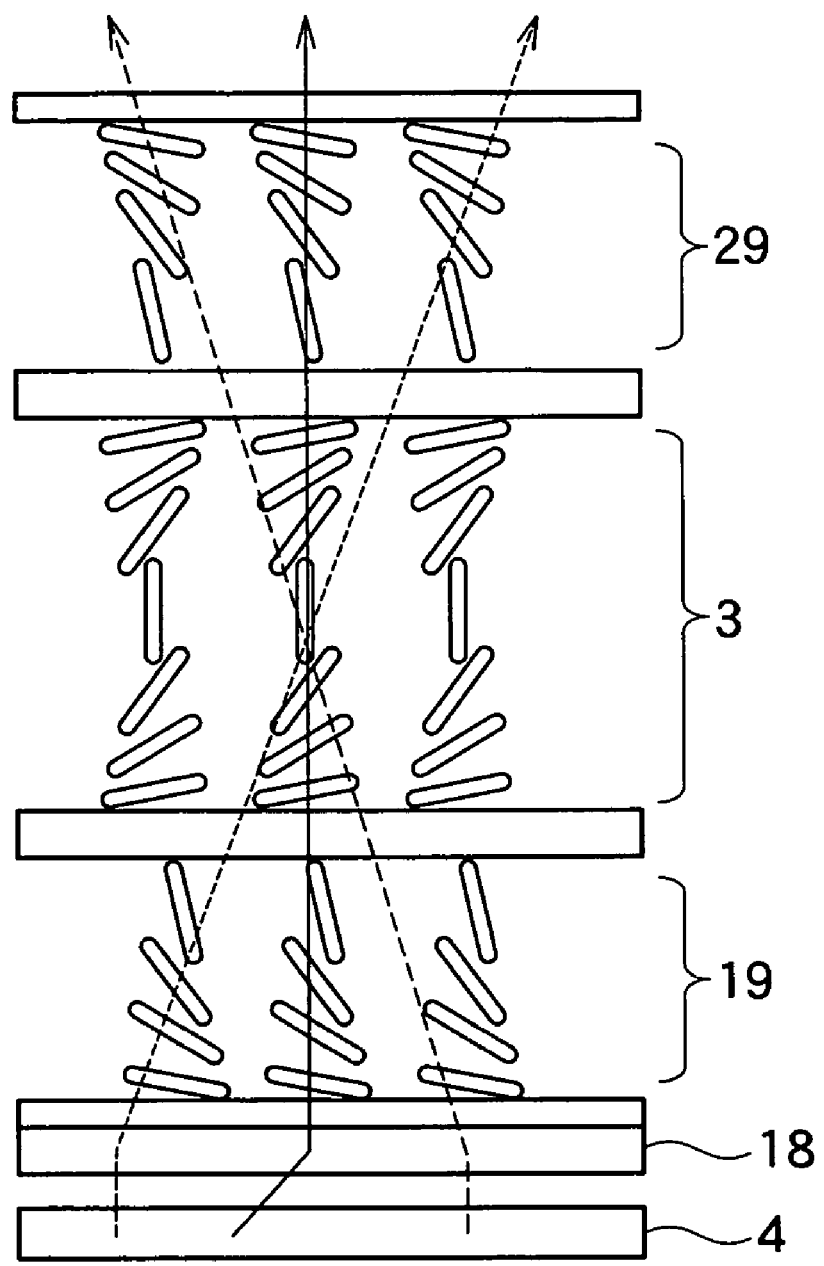
FIG. 9 shows optical paths of light emitted by a backlight in the liquid crystal display device of FIG. 4.

As shown in FIG. 9, in the configuration of the liquid crystal display device of this embodiment, though traveling directions of optical paths of the transmitted light emitted by the backlight 4 are changed by the light diffusion layer 18, the optical paths travel straight without changing the traveling directions by the viewing angle compensating plate 19 and the liquid crystal layer 3 after being made incident onto the viewing angle compensating plate 19. With this configuration, the respective orientation states of the liquid crystal molecules of the liquid crystal layer 3 and the liquid crystal molecules of the viewing angle compensating plate 19, which are designed on the premise that the optical paths travel straight, function effectively. Accordingly, the viewing angle compensating plate 19 exerts the original function to compensate the phase difference.

Hence, according to this embodiment, the light diffusion layer 18 is placed not between the transparent substrate 11 and the viewing angle compensating plate 19 but between the viewing angle compensating plate 19 and the reflective layer 41, and accordingly, once the light emitted from the backlight 4 is made incident onto the viewing angle compensating plate 19, the traveling directions thereof are not changed by the viewing angle compensating plate 19 and the liquid crystal layer 3. Thus, the transmitted light travels straight in any of the vertical direction and the slanting directions, and accordingly, the viewing angle compensating plate 19 can exert the original function to compensate the phase difference. Therefore, the lowering of the contrast ratio can be prevented, and the expansion of the viewing angle can be achieved. Moreover, the light diffusion layer 18 is used, and thus the light reflected on the reflective layer 41 is diffused in the traveling directions by the light diffusion layer 18. Therefore, the occurrence of the double image can be restricted.

Note that, in this embodiment, as an example of the configuration in which the light diffusion layer 18 is placed between the reflective layer 41 and the viewing angle compensating plate 19, description has been made for the configuration in which the light diffusion layer 18 is placed between the polarizing plate 12 on the side where the reflective layer 41 is provided and the viewing angle compensating plate 19. However, the embodiments are not limited to this. Other various embodiments will be described below.

Figure 10:
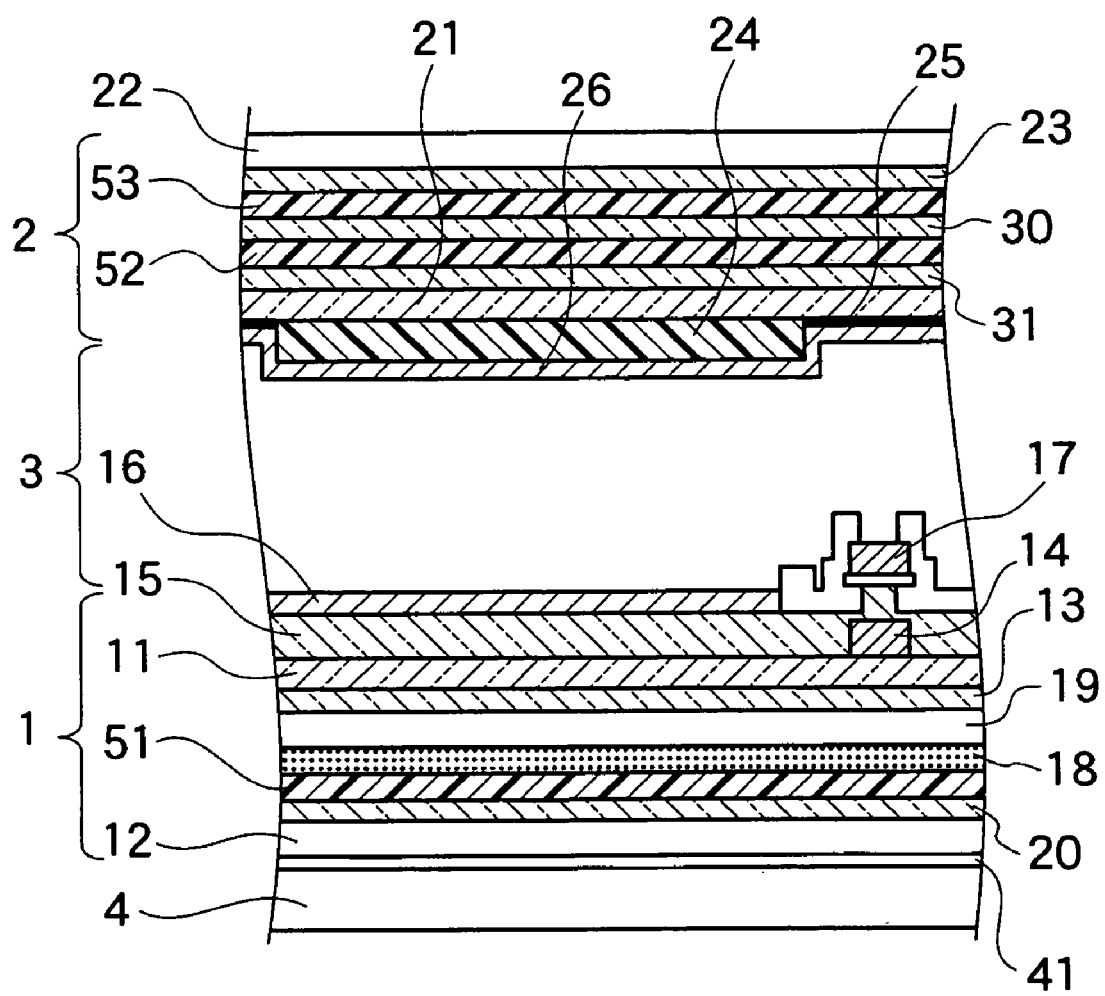
FIG. 10 shows a cross-sectional view of a liquid crystal display device in another embodiment.

As shown in a cross-sectional view of FIG. 10, a liquid crystal display device of another embodiment includes a ½ wave plate 51 between the viewing angle compensating plate 19 and polarizing plate 12 of the array substrate 1 for the purpose of adjusting wavelength dispersion characteristics. And the light diffusion layer 18 is placed between the viewing angle compensating plate 19 and the ½ wave plate 51. Meanwhile, in the opposite plate 2, the viewing angle compensating plate 29 is not formed, and instead thereof, a phase difference plate 52 and a ½ wave plate 53 are formed on a surface of the transparent substrate 21 in an overlapped manner. The phase difference plate 52 is pasted on the surface of the transparent substrate 21 by a transparent adhesive layer 31, and the ½ wave plate 53 is pasted on a surface of the phase difference plate 52 by a transparent adhesive layer 30. On a surface of the ½ wave plate 53, the polarizing plate 22 is pasted by the transparent adhesive layer 23. With regard to others, the same reference numerals are assigned to the same objects as those in FIG. 8, and repetitive description will be omitted here.

Figure 11:
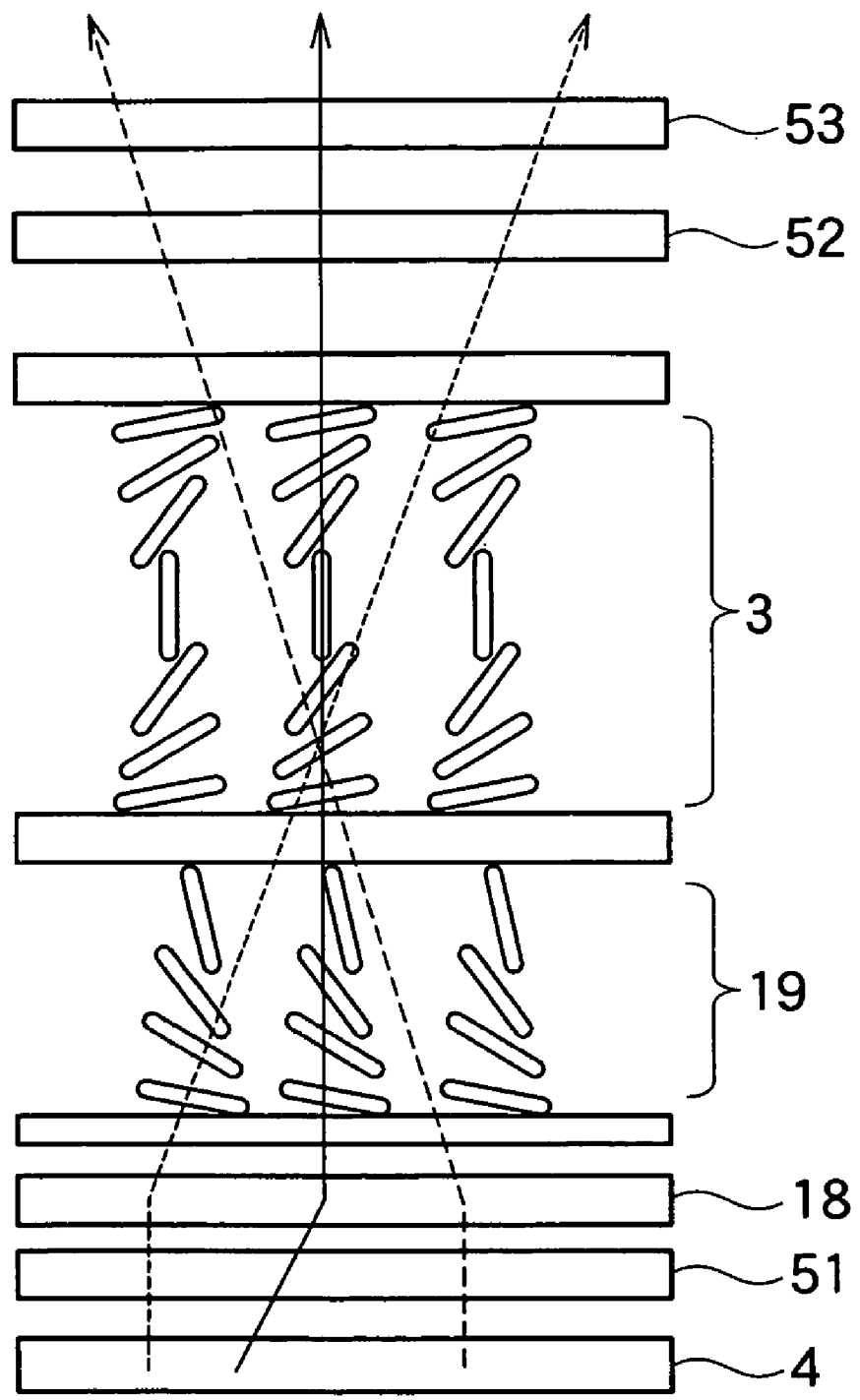
FIG. 11 shows optical paths emitted by a backlight in the liquid crystal display device of FIG. 10.

Also in the liquid crystal display device configured as described above, as shown in FIG. 11, though traveling directions of light emitted from the backlight 4 are changed by the light diffusion layer 18 after the light transmits through the ½ wave plate 51, the traveling directions are not changed in the viewing angle compensating plate 19 and the liquid crystal layer 3 once the light is made incident onto the viewing angle compensating plate 19. Accordingly, the viewing angle compensating plate 19 exerts the original function to compensate the phase difference. Therefore, the lowering of the contrast ratio can be prevented, and the expansion of the viewing angle can be achieved. Moreover, use of the light diffusion layer 18 makes it possible to restrict the occurrence of the double image caused by the light reflected on the reflective layer 41.

Moreover, as for a liquid crystal display device of still another embodiment, the light diffusion layer 18 is not placed between the viewing angle compensating plate 19 and the ½ wave plate 51 as shown in FIG. 10, but may be placed between the ½ wave plate 51 and the polarizing plate 12. Also in this case, a similar effect to the above can be exerted.

Furthermore, as for a liquid crystal display device of yet another embodiment, a brightness enhanced film layer which has polarization and reflection functions is provided between the polarizing plate 12 and reflective layer 41 of the array substrate 1, and the light diffusion layer 18 may be placed between the brightness enhanced film layer and the polarizing plate 12. Also in this case, the similar effect to the above can be exerted.

FIG. 12 is a table summarizing optical characteristics of the respective liquid crystal display devices described above. Example 1 is the liquid crystal display device described by use of FIG. 8, and Example 2 is the liquid crystal display device described by use of FIG. 10. Moreover, Comparative examples 1 to 4 are the first to fourth related arts, respectively. Moreover, viewing angle characteristics show angular ranges of viewing angles where the contrast ratio exceeds 10.

As shown in this table, in each of Examples 1 and 2, the occurrence of the double image can be restricted, and in addition, even in comparison with Comparative example 4, a good contrast ratio is obtained, and the viewing angle is widened.

What is claimed is:

1. A liquid crystal display device, comprising:
   a pair of transparent substrates placed opposite to each other;
   a liquid crystal layer placed between the respective transparent substrates;
   a pair of polarizing plates placed on outsides of the respective transparent substrates;
   a reflective layer placed on an outside of one of the polarizing plates;
   a viewing angle compensating plate placed between the polarizing plate and the transparent substrate on a side where the reflective layer is provided, and the viewing angle compensating plate is formed of a polymer compound containing liquid crystal molecules of which orientation state is fixed;
   a light diffusion layer placed not between the transparent substrate and the viewing angle compensating plate but between the viewing angle compensating plate and the reflective layer; and
   a ½ wave plate between the polarizing plate and the viewing angle compensating plate on the side where the reflective layer is provided;
   wherein the light diffusion layer is placed between the viewing angle compensating plate and the ½ wave plate.

2. A liqiuid crystal display device comprising:
   a pair of transparent substrates placed opposite to each other;
   a ligiuid crystal layer placed between the respective transparent substrates;
   a pair of polarizing plates placed on outsides of the respective transparent substrates;
   a reflective layer placed on an outside of one of the polarizing plates;
   a viewing angle compensating plate placed between the polarizing plate and the transparent substrate on a side where the reflective layer is provided and the viewing angle compensating plate is formed of a polymer compound containing liquid crystal molecules of which orientation state is fixed;
   a light diffusion layer placed not between the transparent substrate and the viewing angle compensating plate but between the viewing angle compensating plate and the reflective layer; and
   a ½ wave plate between the polarizing plate and the viewing angle compensating plate on the side where the reflective layer is provided;
   wherein the light diffusion layer is placed between the ½ wave plate and the polarizing plate.

* * * * *